(12) United States Patent
Zhu

(10) Patent No.: US 11,868,031 B2
(45) Date of Patent: Jan. 9, 2024

(54) ELECTRICALLY CONTROLLED SLIDING APPARATUS FOR PHOTOGRAPHIC EQUIPMENT AND LOCKING ASSEMBLY THEREOF

(71) Applicant: ZHONGSHAN DASHAN PHOTOGRAPHIC EQUIPMENT CO., LTD., Zhongshan (CN)

(72) Inventor: Xihua Zhu, Zhongshan (CN)

(73) Assignee: ZHONGSHAN DASHAN PHOTOGRAPHIC EQUIPMENT CO., LTD., Zhongshan (CN)

( * ) Notice: Subject to any disclaimer, the term of this patent is extended or adjusted under 35 U.S.C. 154(b) by 32 days.

(21) Appl. No.: 17/440,184

(22) PCT Filed: May 6, 2021

(86) PCT No.: PCT/CN2021/091908
§ 371 (c)(1),
(2) Date: Sep. 16, 2021

(87) PCT Pub. No.: WO2022/012117
PCT Pub. Date: Jan. 20, 2022

(65) Prior Publication Data
US 2023/0099957 A1 Mar. 30, 2023

(30) Foreign Application Priority Data
Jul. 16, 2020 (CN) .......................... 202010687717.3

(51) Int. Cl.
*G03B 17/56* (2021.01)
*F16M 11/04* (2006.01)
(Continued)

(52) U.S. Cl.
CPC .......... *G03B 17/561* (2013.01); *F16M 11/04* (2013.01); *F16M 11/043* (2013.01);
(Continued)

(58) Field of Classification Search
CPC ...... G03B 17/561; F16M 11/04; F16M 11/10; F16M 11/12; F16M 11/18; F16M 11/043; F16M 11/028
(Continued)

(56) References Cited

U.S. PATENT DOCUMENTS 7,530,245 B2 * 5/2009 Fan .......................... E05B 63/18
70/471
7,789,356 B1 9/2010 Jones
(Continued)

FOREIGN PATENT DOCUMENTS

CN 204539327 U * 8/2015
CN 206802694 U * 12/2017
(Continued)

OTHER PUBLICATIONS

International Search Report issued in corresponding International application No. PCT/CN2021/091908, dated Aug. 5, 2021.
(Continued)

*Primary Examiner* — Stephanie E Bloss
*Assistant Examiner* — Kevin C Butler

(57) ABSTRACT

The present disclosure relates to an electrically controlled sliding apparatus for photographic equipment and a locking assembly thereof. The locking assembly for the electrically controlled sliding apparatus includes a fixed base mounted on the electrically controlled sliding apparatus and a locking fitting mounted on the fixed base. A driven member of the electrically controlled sliding apparatus is mounted within the fixed base. The locking fitting is capable of rotating relative to the fixed base after being pressed against the fixed base, so as to lock or unlock the driven member. The locking assembly for the electrically controlled sliding apparatus provided by the present disclosure is convenient to operate and simple in structure, and is capable of achieving that the (Continued)

sliding block is rapidly locked or unlocked on the guiding rail.

8 Claims, 5 Drawing Sheets

(51) Int. Cl.
 *F16M 11/18* (2006.01)
 *F16M 11/12* (2006.01)
 *F16M 11/10* (2006.01)
(52) U.S. Cl.
 CPC ............. *F16M 11/10* (2013.01); *F16M 11/12* (2013.01); *F16M 11/18* (2013.01); *F16M 2200/028* (2013.01)
(58) Field of Classification Search
 USPC .......................................................... 396/428
 See application file for complete search history.

(56) References Cited

U.S. PATENT DOCUMENTS

| | | | | |
|---|---|---|---|---|
| 8,291,783 | B2 * | 10/2012 | Shi | ........................ E05F 15/622 74/89.39 |
| 8,555,548 | B2 * | 10/2013 | Carter | ..................... E05F 11/16 49/260 |
| 9,243,737 | B2 * | 1/2016 | Hida | .................... F16M 11/045 |
| D805,118 | S * | 12/2017 | Caldeira | ....................... D16/242 |
| 10,502,358 | B2 * | 12/2019 | Zhao | ...................... F16M 11/42 |
| D882,671 | S * | 4/2020 | Yang | ............................ D16/242 |
| 11,187,008 | B2 * | 11/2021 | Kwon | ................... E05B 13/005 |
| D959,419 | S * | 8/2022 | Cheng | .......................... D16/242 |
| 11,474,418 | B2 * | 10/2022 | Zeng | ...................... F16M 11/24 |
| 2006/0261657 | A1 * | 11/2006 | Luo | ........................ B60N 2/236 297/367 R |
| 2008/0266688 | A1 * | 10/2008 | Errando Smet | ......... B60R 1/074 359/877 |
| 2010/0008661 | A1 * | 1/2010 | Wood | ................... G03B 17/561 396/428 |
| 2014/0161434 | A1 * | 6/2014 | Koymen | ................ F16M 11/18 396/428 |
| 2015/0233521 | A1 | 8/2015 | Hida | |

FOREIGN PATENT DOCUMENTS

| | | | | |
|---|---|---|---|---|
| CN | 110043775 | A * | 7/2019 | ............. F16M 11/42 |
| CN | 110043775 | A | 7/2019 | |
| CN | 111734931 | A * | 10/2020 | ............. F16M 11/04 |
| FR | 2266186 | A * | 11/1975 | ............. G03B 23/06 |
| JP | 2011130821 | A | 7/2011 | |

OTHER PUBLICATIONS

Written Opinion of the International Search Authority in corresponding International application No. PCT/CN2021/091908.
European Search Report issued in EP application No. 21769623.6, dated May 25, 2023.

* cited by examiner

US 11,868,031 B2

ELECTRICALLY CONTROLLED SLIDING APPARATUS FOR PHOTOGRAPHIC EQUIPMENT AND LOCKING ASSEMBLY THEREOF

TECHNICAL FIELD

The present disclosure relates to an electrically controlled sliding apparatus for photographic equipment and a locking assembly thereof.

BACKGROUND

A sliding apparatus for photographic equipment is a movable shooting device which is quite frequently used during shooting. The sliding apparatus mainly includes a guiding rail, a sliding block, and a driving apparatus for driving the sliding block to slide. During use, the driving unit drives the sliding block to move a camera fixed on the sliding block so that a desired capturing effect is achieved. At present, a locking of a sliding block of an existing sliding apparatus in the market on a guiding rail is generally realized by a locking braking screw disposed on the sliding block. The locking braking screw is screwed to lock the sliding block on the guiding rail or unlock the sliding block locked on the guiding rail. However, the locking of the sliding block by such a locking braking screw is not suitable for multiplying the sliding apparatus.

SUMMARY

Technical Problem

In view of this, an objective of the present disclosure is to provide a locking assembly for alleviating or avoiding the above problem to some extent, and an electrically controlled sliding apparatus for photographic equipment with the locking assembly.

Technical Solution

The present disclosure provides a locking assembly for an electrically controlled sliding apparatus, including a fixed base mounted on the electrically controlled sliding apparatus and a locking fitting mounted on the fixed base, wherein a driven member of the electrically controlled sliding apparatus is mounted within the fixed base, and the locking fitting is capable of rotating relative to the fixed base after being pressed against the fixed base, so as to lock or unlock the driven member.

In some embodiments, the locking fitting includes a body, an elastic member abutting between the body and the fixed base, and a locking member sleeved on the body.

In some embodiments, the body of the locking fitting includes a rotating member and a main shaft fixed on the rotating member, wherein the main shaft moves and rotates relative to the fixed base along with movement and rotation of the rotating member.

In some embodiments, the main shaft includes a first non-circular portion, a first circular portion, a second non-circular portion, a second circular portion and a third non-circular portion sequentially arranged along an axial direction of the main shaft.

In some embodiments, the first non-circular portion and the third non-circular portion can be respectively stopped in a first through hole and a second through hole of the fixed base, so as to prevent the main shaft from rotating relative to the fixed base.

In some embodiments, the locking member is at least partially sleeved at the second non-circular portion, and the second non-circular portion is capable of driving the locking member to rotate, such that the locking member is engaged with or disengaged from the driven member.

In some embodiments, after the rotating member is pressed against the fixed base, the first circular portion and the second circular portion are respectively located at the first through hole and the second through hole of the fixed base, so as to allow the locking fitting to rotate relative to the fixed base.

In some embodiments, the locking member includes a connecting portion and at least one engaging portion extending radially outwards from the connecting portion, and the second non-circular portion is at least partially engaged in the connecting portion.

In some embodiments, the locking fitting further includes a blocking member adjacent to the rotating member of the body, and the rotating member and the blocking member are enclosed to form an accommodating space for receiving the elastic member.

In some embodiments, the blocking member includes a protrusion extending axially outwards from a closed end thereof, and the fixed base is provided with an annular hole at a position corresponding to the protrusion to limit a rotation angle of the rotating fitting relative to the fixed base.

The present disclosure further provides an electrically controlled sliding apparatus for photographic equipment, including a main controlling assembly, a guiding assembly mounted on one side of the main controlling assembly, a sliding assembly slidably mounted on the guiding assembly, and a locking assembly mounted on the guiding assembly, wherein the locking assembly is the above-mentioned locking assembly.

Beneficial Effect

The locking assembly for the electrically controlled sliding apparatus provided by the present disclosure is convenient to operate and simple in structure, and is capable of achieving that the sliding block is rapidly locked or unlocked on the guiding rail.

Reference signs: 100: electrically controlled sliding apparatus; 1: main controlling assembly; 11: housing; 12: main controlling module; 13: driving member; 14: controlling panel; 2: guiding assembly; 21: guiding rail; 22: driving belt; 23: driven member; 3: sliding assembly; 31: supporting base; 32: mounting base; 4: locking assembly; 41: fixed base; 410: opening; 411: first through hole; 412: second through hole; 413: annular hole; 42: locking fitting; 420: body; 201: rotating member; 202: main shaft; 203: first non-circular portion; 204: first circular portion; 205: second non-circular portion; 206: second circular portion; 207: third non-circular portion; 208: first connecting member; 209: second connecting member; 421: elastic member; 423: locking member; 231: connecting portion; 232: engaging portion; 233: connecting hole; 424: blocking member; 240: main body; 241: closed end; 24: protrusion; 243: third through hole; 244: recess; 245: boss; 426: first sleeve; and 427: second sleeve.

DESCRIPTION OF THE EMBODIMENTS

In order to further clarify the objective and advantage of the present disclosure, the present disclosure will be illustrated in detail in conjunction with accompanying drawings and embodiments hereinafter. It should be understood that the specific embodiments described here are only for explaining the present disclosure, but not for limiting the present disclosure.

Figure 1:
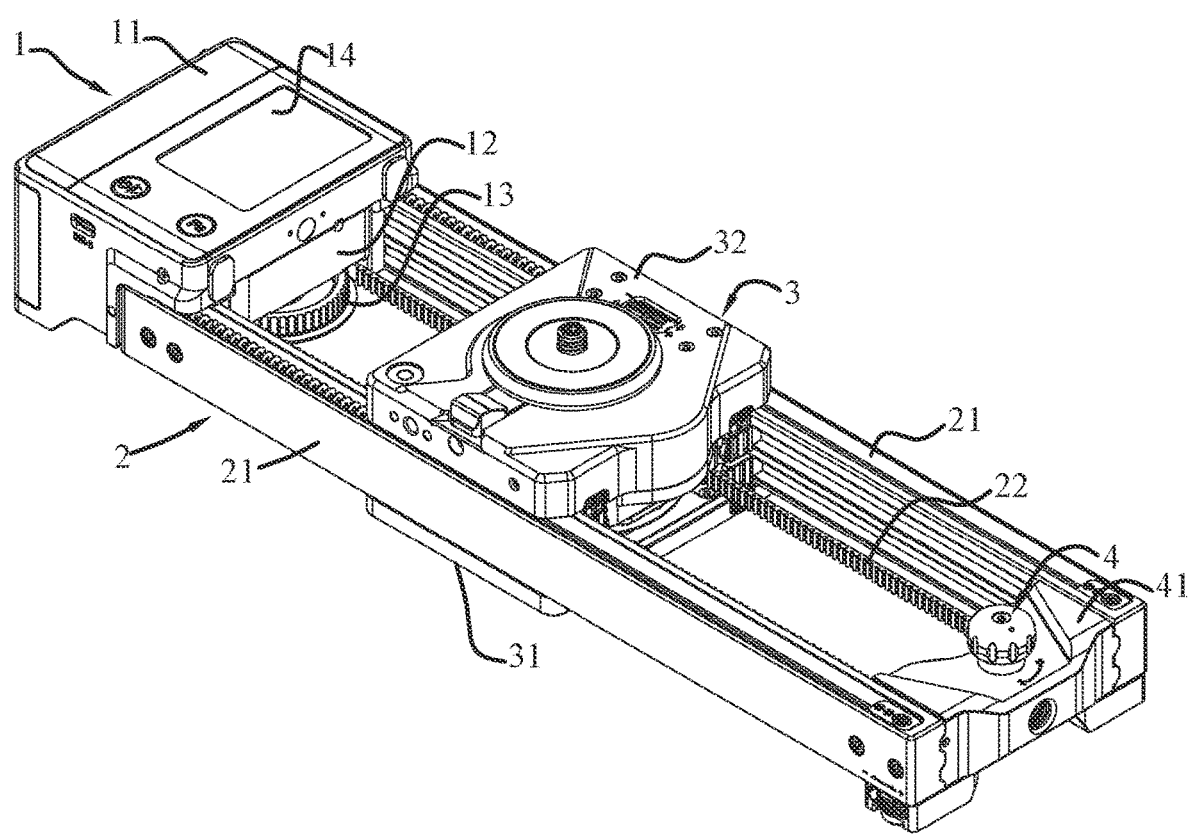
FIG. 1 is a perspective view showing an electrically controlled sliding apparatus for photographic equipment according to an embodiment of the present disclosure.

As shown in FIG. 1, an electrically controlled sliding apparatus 100 for photographic equipment of the present disclosure includes a main controlling assembly 1, a guiding assembly 2 mounted on one side of the main controlling assembly 1, a sliding assembly 3 slidably mounted on the guiding assembly 2, and a locking assembly 4 mounted on the guiding assembly 2. The main controlling assembly 1 controls the guiding assembly 2 and the sliding assembly 3. The locking assembly 4 acts on the guiding assembly 2 to stop the sliding assembly 3 at any position of the guiding assembly 2. The sliding assembly 3 includes a supporting base 31 and a mounting base 32 which are slidably mounted on the guiding assembly 2. The mounting base 32 is configured to mount a photographic apparatus (for example, a camera, a video camera, and the like). The main controlling assembly 1 controls the guiding assembly 2, such that the supporting base 31 and the mounting base 32 move on the guiding assembly 2 towards or away from each other, so that a moving distance of the mounting base 32 may be doubled. In this embodiment, the supporting base 32 can be rapidly connected to a bracket of the photographic equipment, so that the electrically controlled sliding apparatus 100 is connected to the bracket of the photographic equipment.

The main controlling assembly 1 includes a housing 11, a main controlling module 12 mounted in the housing 11, and a driving member 13 connected to the main controlling module 12 and controlled by the main controlling module 12. Preferably, a controlling panel 14 is arranged on an upper surface of the housing 11, and the controlling panel 14 is electrically connected to the main controlling module 12. A user may control and view an operating status of the electrically controlled sliding apparatus 100 by means of the controlling panel 14. In this embodiment, the driving member 13 is configured as a driving gear, which drives the guiding assembly 2 to operate under the control of the main controlling module 12.

Figure 2:
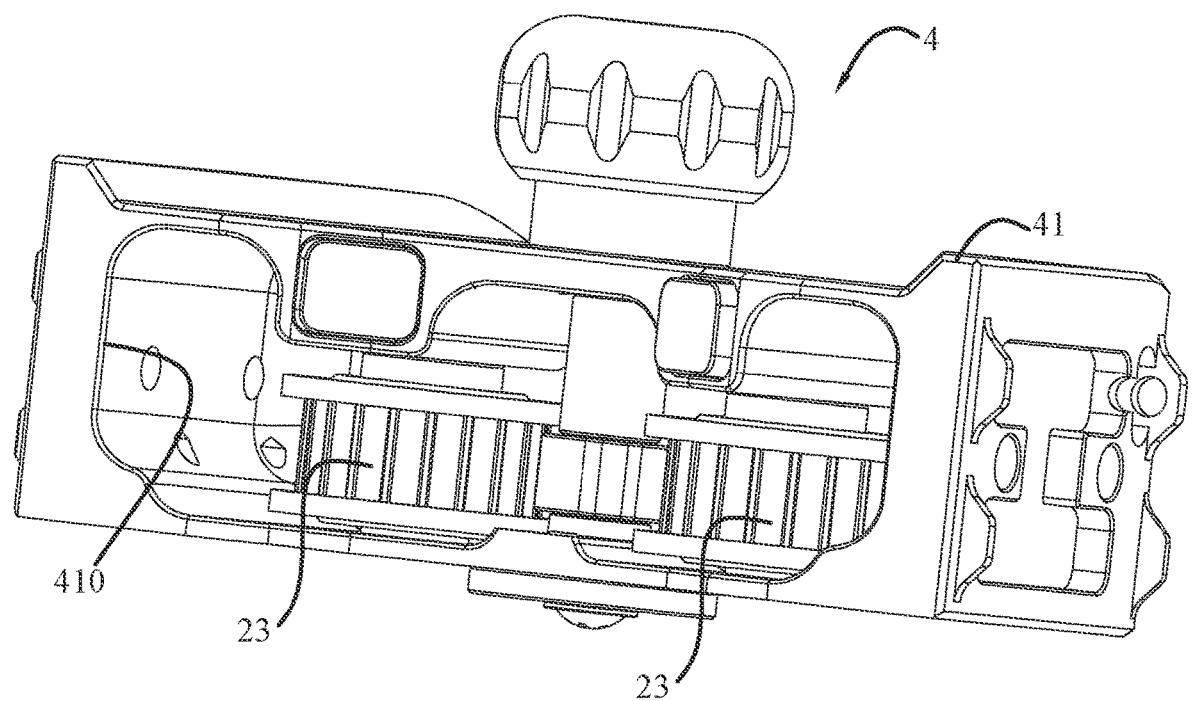
FIG. 2 is a perspective view showing a locking assembly of an electrically controlled sliding apparatus shown in FIG. 1.

Referring to FIG. 1 and FIG. 2, the guiding assembly 2 includes two guiding rails 21, a driving belt 22 and a driven member 23. One end of each of the two guiding rails 21 is connected and fixed on a side surface of the housing 11 of the main controlling assembly 1. The driven member 23 is disposed at one end, which is away from the main controlling assembly 1, of each of the guiding rails 21, is located between the two guiding rails 21, and is opposite to the main controlling assembly 1. In this embodiment, the driven member 23 is configured as a rotating wheel set, wherein the rotating wheel set includes two identical gears. Alternatively, the driven member 23 may be configured as the same driven gear as the driving gear of the driving member 13. Preferably, the driving member 13 and the driven member 23 are both provided with external teeth, and the driving belt 22 is provided with internal teeth engaged with the external teeth and is capable of moving synchronously with rotation of the driving member 13. The driving belt 22 is supported by the driving member 13 and the driven member 23 and encircles the driving member 13 and the driven member 23. Thus, the driving member 13, the driving belt 22 and the driven member 23 cooperate with each other to realize synchronous belt transmission.

The supporting base 31 and the mounting base 32 of the sliding assembly 3 can be respectively driven by the driving belt 22 to move, so that the supporting base 31 and the mounting base 32 move towards to or away from each other on the guiding rails 21 of the guiding assembly 2. When the sliding assembly 3 needs to stay at a certain position of the guiding rails 21, the user can drive the locking assembly 4 to lock the rotation of the driven member 23, so that the sliding assembly 3 stays at the position of the guiding rails 21. The locking assembly 4 includes a fixed base 41 and a locking fitting 42 movably mounted on the fixed base 41. The fixed base 41 is mounted at one end, which is away from the main controlling assembly 1, of each of the guiding rails 21 of the guiding assembly 2. Preferably, the fixed base 41 is generally configured as a hollow box body with an opening in one side. An opening 410 of the fixed base 41 faces the main controlling assembly. In this embodiment, the driven member 23 of the guiding assembly 2 is mounted inside the fixed base 41. The fixed base 41 is provided with a first through hole 411 and a second through hole 412 opposite to each other. The locking fitting 42 vertically penetrates through the fixed base 41 via the first through hole 411 and the second through hole 412 and is capable of moving and rotating relative to the fixed base 41. The user stops the rotation of the driven member 23 by moving and rotating the locking fitting 42, so as to stop the sliding assembly 3 at a desired position.

Figure 3:
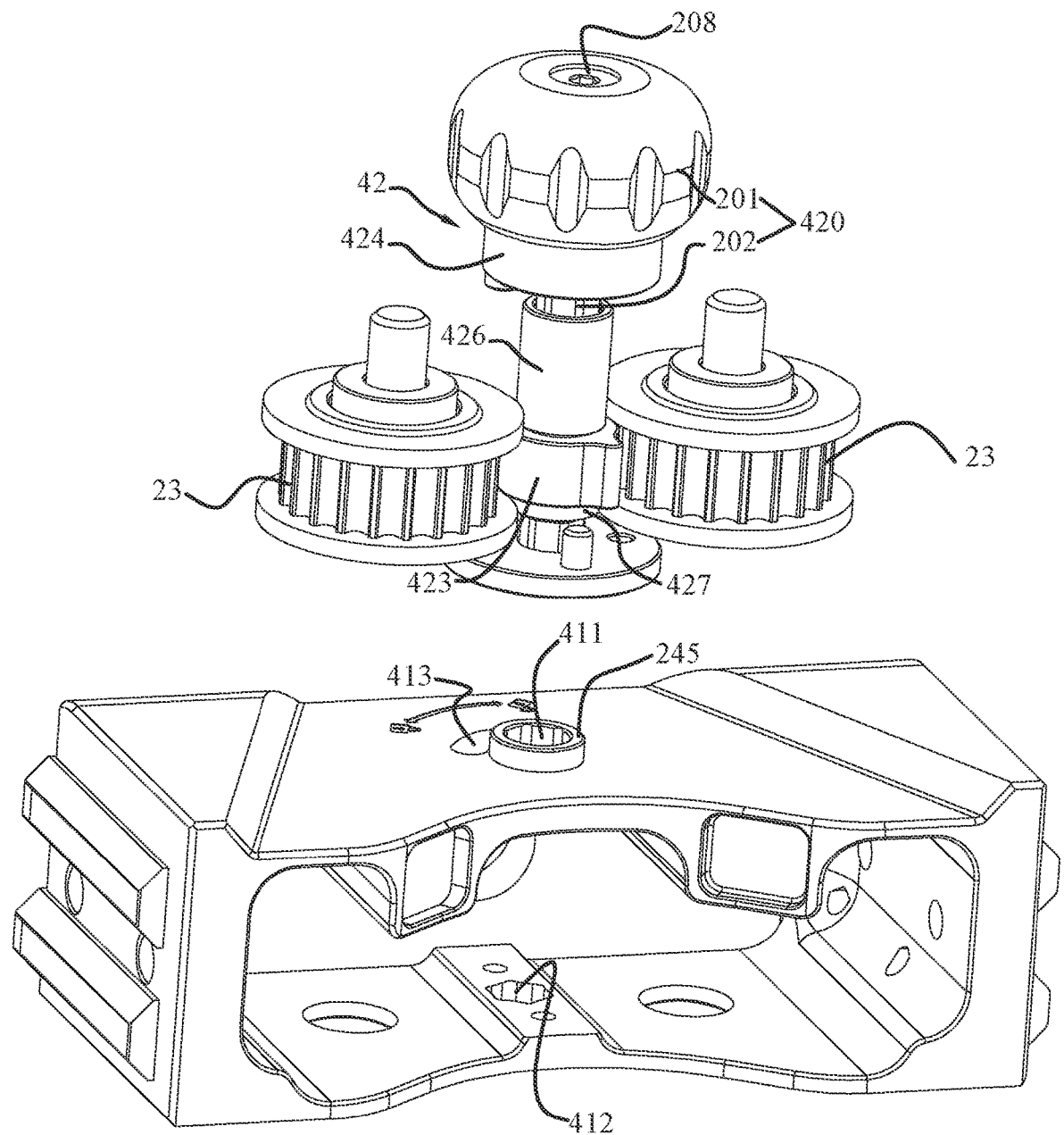
FIG. 3 is an exploded view showing a locking assembly shown in FIG. 2.
Figure 4:
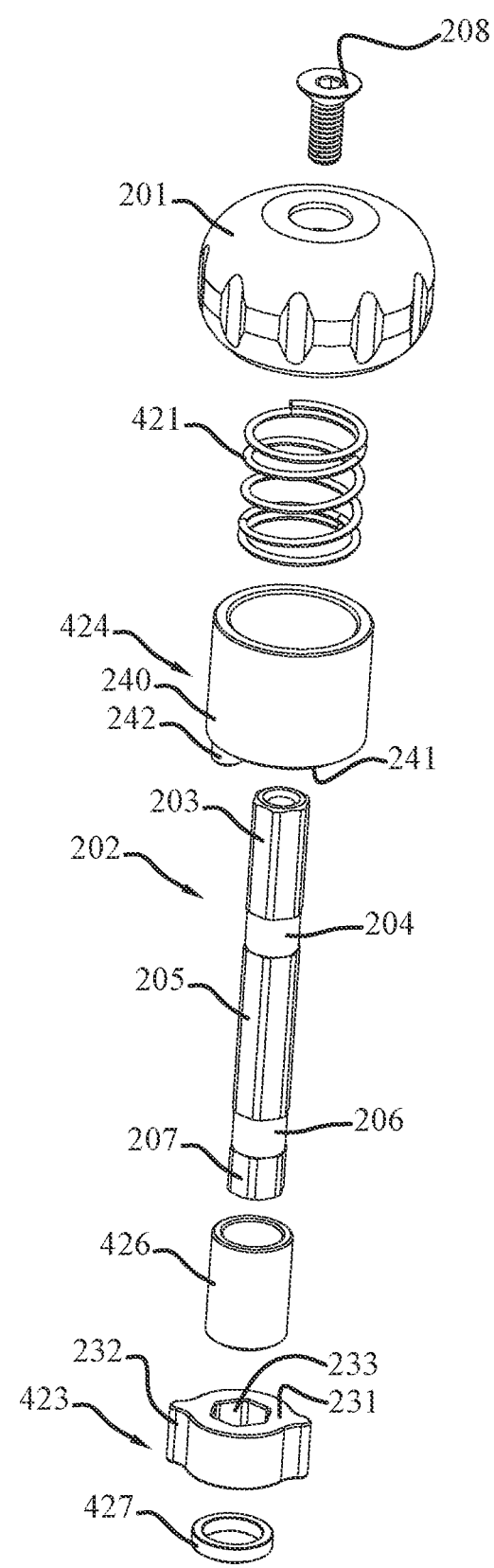
FIG. 4 is an exploded view showing a locking fitting of a locking assembly shown in FIG. 2.
Figure 5:
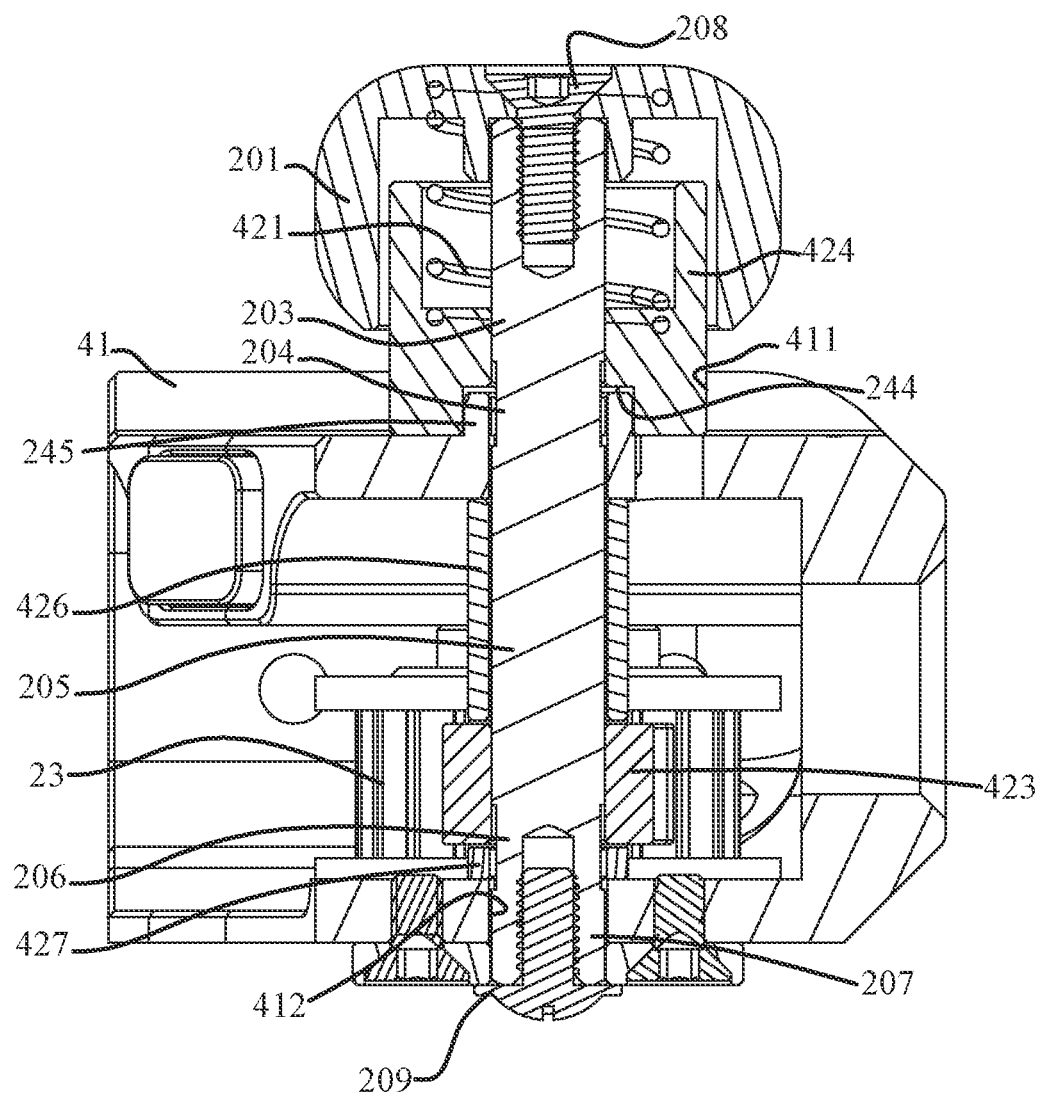
FIG. 5 is an axial cross-sectional view showing a locking assembly shown in FIG. 2.

Referring to FIG. 3 to FIG. 5, the locking fitting 42 includes a main body 420, an elastic member 421 abutting between the main body 420 and the fixed base 41, and a locking member 423 sleeved on the main body 420. In this embodiment, the body 420 includes a rotating member 201 and a main shaft 202 fixed on the rotating member 201. The elastic member 421 is disposed between the rotating member 201 and the fixed base 41. Preferably, the elastic member 421 is a spring. The locking member 423 is sleeved on the main shaft 202. The rotating member 201 has a diameter greater than that of the main shaft 202. The main shaft 202 is capable of moving relative to the locking member 423. The rotating member 201 is pressed and rotated by the user, and the main shaft 202 fixed on the rotating member 201 moves and rotates relative to the fixed base 41 along with movement and rotation of the rotating member 201, thereby driving the locking member 201 to be engaged with the driven member 23, and then locking the driven member 23, so that the sliding assembly 3 stays on the guiding rails 21.

In this embodiment, the main shaft 202 penetrates through the fixed base 41 via the first through hole 411 and the second through hole 412 of the fixed base 41. Two ends of the main shaft 202 protrude from two opposite sides of the fixed base 41, respectively. One end of the main shaft 202 is fixed to the rotating member 201 by a first connecting member 208, and the other end of the main shaft 202 is blocked on a respective side of the fixed base 41 by a second connecting member 209, so as to prevent the locking fitting from being disengaged from the fixed base. In this embodiment, both the first connecting member 208 and the second connecting member 209 are configured as bolts. A diameter of the second connecting member 209 in a radial direction perpendicular to the axial direction is greater than that of the second through hole 412 of the fixed base 41 in this direction, so that the locking fitting 42 is blocked at the second through hole 412 of the fixed base 41. Optionally, the rotating member 201 and the main shaft 202 may be integrally disposed.

In this embodiment, the main shaft 202 includes a first non-circular portion 203, a first circular portion 204, a second non-circular portion 205, a second circular portion 206 and a third non-circular portion 207. The first non-circular portion 203, the first circular portion 204, the second non-circular portion 205, the second circular portion 206 and the third non-circular portion 207 are arranged sequentially along the axial direction of the main shaft 202. The first non-circular portion 203 and the third non-circular portion 207 can be respectively stopped at the first through hole 411 and the second through hole 412 of the fixed base 41, so as to prevent the main shaft 202 from rotating relative to the fixed base 41. In this embodiment, the first through hole 411 and the second through hole 412 match the first non-circular portion 203 and the third non-circular portion 207 in shape, respectively. The locking member 423 is at least partially sleeved on the second non-circular portion 205. The second non-circular portion 205 is capable of driving the locking member 423 to rotate, so that the locking member 423 is engaged with the driven member 23. In this embodiment, the first non-circular portion 203, the second non-circular portion 205, and the third non-circular portion 207 are all hexagonal in lateral cross-sections. The first circular portion 204 and the second circular portion 206 can be located within the first through hole 411 and the second through hole 412, respectively. Moreover, when the first circular portion 204 and the second circular portion 206 are located within the first through hole 411 and the second through hole 412, respectively, the main shaft 202 is allowed to rotate relative to the fixed base 41.

Particularly, the rotating member 201 is pressed downwards towards the fixed base 41, so as to drive the main shaft 202 to move in the axial direction of the main shaft 202. At this time, the elastic member 421 is compressed, and the first circular portion 204 and the second circular portion 206 are located at the first through hole 411 and the second through hole 412, respectively. Meanwhile, the second non-circular portion 205 is engaged within the locking member 423. The rotating member 201 is rotated in a first direction to drive the main shaft 202 to rotate, and the locking member 423 is engaged at the driven member 23 under the action of the second non-circular portion 205, and then the rotating member 201 drives the main shaft 202 to move upwards under the action of the elastic member 421. At this time, the first non-circular portion 203 and the third non-circular portion 207 are located at the first through hole 411 and the second through hole 412, respectively and the second non-circular portion 205 is at least partially engaged within the locking member 423, so as to prevent the locking member 423 from moving, thereby locking the driven member 23 to stay the sliding assembly 3 on the guiding rails 21.

In order to release the locking of the locking member 423 on the driven member 23, the rotating member 201 is pressed towards the fixed base 41, and then the rotating member 201 is rotated in a second direction, so that the second non-circular portion 205 of the main shaft 202 drives the locking member 423 to rotate, so as to release the engagement of the locking member 423 with the driven member 23. Moreover, the pressing on the rotating member 201 is released, so that the rotating member 201 drives the main shaft 202 to move upwards under the action of the elastic member 421. At this time, the first non-circular portion 203 and the second non-circular portion 205 are located at the first through hole 411 and the second through hole 412, respectively, and the second non-circular portion 205 is at least partially engaged within the locking member 423, so as to prevent the locking member 423 from moving, thereby preventing the locking member 423 from affecting the rotation of the driven member 23.

In this embodiment, the locking member 423 includes a connecting portion 231 and at least one engaging portion 232 extending radially outwards from the connecting portion 231. The connecting portion 231 is substantially of a shape of a hollow column. A center of the connecting portion 231 is set as a connecting hole 233, and the second non-circular portion 205 is at least partially engaged in the connecting hole 233, that is, the connecting hole 233 is substantially the same as the second non-circular portion 205 in shape. The second non-circular portion 205 is capable of moving in the connecting hole 233 along the axial direction of the main shaft 202 without being disengaged from the connecting hole 233 in a movement process. In this embodiment, the at least one engaging portion 232 includes two engaging portions extending opposite to each other. Preferably, the engaging portion 232 is sized to be able to engage among the teeth of the driven member 23. In this embodiment, in order to prevent the locking member 423 from moving along the axial direction of the main shaft 202, a first sleeve 426 is arranged between one side of the fixed base 41 with the first through hole 411 and the locking member 423. The first sleeve 426 is disposed on the main shaft 202, and two ends of the first sleeve 426 abut against the fixed base 41 and the locking member 423, respectively. It is conceivable that the main shaft 202 is capable of moving and rotating relative to the first sleeve 426. Optionally, a second sleeve 427 is arranged between one side of the fixed base 41 with the second through hole 412 and the locking member 423.

Furthermore, the locking fitting 42 further includes a blocking member 424 adjacent to the rotating member 201 of the main body 420. The rotating member 201 and the blocking member 424 are enclosed to form an accommodating space for receiving the elastic member 421. In this way, the elastic member 421 abuts between the blocking member 424 and the rotating member 201 of the main body 420. The blocking member 424 includes a hollow main body 240 with an opening in one end and a protrusion 242 extending axially outwards from a closed end 241 of the main body 240. The main body 240 provides a portion of the above-mentioned accommodating space. Preferably, the rotating member 201 is sleeved on an outer side of the blocking member 424 and is capable of moving in an axial direction of the rotating member 201 relative to the blocking member 424. In this embodiment, the first non-circular portion 203 of the main shaft 202 of the main body 420 passes through a third through hole 243 at the center of the closed end 241 of the main body 240, so that the blocking member 424 rotates along with rotation of the rotating member 201. Due to the design of the blocking member 424, the attraction to the apparatus is improved, and the entire locking fitting 42 rotates smoothly. The protrusion 242 is configured to limit a rotation angle of the rotating member 201. The fixed base 41 of the locking assembly 4 is provided with an annular hole 413 at a position corresponding to the protrusion 242 of the blocking member 424. The protrusion 242 is inserted into the annular hole 413.

In this embodiment, a center of an axially outer side of the closed end 241 of the blocking member 424 is recessed to form a recess 244, the fixed base 41 is provided with a boss 245 at a position corresponding to the recess 244. In this way, the boss 245 is engaged within the recess 244. A concave-convex arrangement of the recess 244 and the boss 245 makes the blocking member 424 not deviate relative to the fixed base 41.

In summary, those described above are just preferred embodiments of the present disclosure, and are not intended to limit the scope of implementation of the present disclosure. That is, any equivalent changes and modifications made based on the content of the present disclosure are within the technical scope of the present disclosure.

What is claimed is:

1. A locking assembly for an electrically controlled sliding apparatus, comprising a fixed base mounted on the electrically controlled sliding apparatus and a locking fitting mounted on the fixed base, a driven member of the electrically controlled sliding apparatus being mounted within the fixed base, wherein the locking fitting is capable of rotating relative to the fixed base after being pressed against the fixed base, so as to lock or unlock the driven member; wherein the locking fitting comprises a body, an elastic member abutting between the body and the fixed base, and a locking member sleeved on the body; wherein the body of the locking fitting comprises a rotating member and a main shaft fixed on the rotating member, wherein the main shaft moves and rotates relative to the fixed base along with movement and rotation of the rotating member, wherein the main shaft comprises a first non-circular portion, a first circular portion, a second non-circular portion, a second circular portion and a third non-circular portion sequentially arranged along an axial direction of the main shaft.

2. The locking assembly according to claim 1, wherein the first non-circular portion and the third non-circular portion can be respectively stopped in a first through hole and a second through hole of the fixed base, so as to prevent the main shaft from rotating relative to the fixed base.

3. The locking assembly according to claim 1, wherein the locking member is at least partially sleeved at the second non-circular portion, and the second non-circular portion is capable of driving the locking member to rotate, such that the locking member is engaged with or disengaged from the driven member.

4. The locking assembly according to claim 1, wherein after the rotating member is pressed against the fixed base, the first circular portion and the second circular portion are respectively located at the first through hole and the second through hole of the fixed base, so as to allow the locking fitting to rotate relative to the fixed base.

5. The locking assembly according to claim 1, wherein the locking member comprises a connecting portion and at least one engaging portion extending radially outwards from the connecting portion, and the second non-circular portion is at least partially engaged in the connecting portion.

6. The locking assembly according to claim 1, wherein the locking fitting further comprises a blocking member adjacent to the rotating member of the body, and the rotating member and the blocking member are enclosed to form an accommodating space for receiving the elastic member.

7. The locking assembly according to claim 6, wherein the blocking member comprises a protrusion extending axially outwards from a closed end thereof, and the fixed base is provided with an annular hole at a position corresponding to the protrusion to limit a rotation angle of the rotating fitting relative to the fixed base.

8. An electrically controlled sliding apparatus for photographic equipment, comprising a main controlling assembly, a guiding assembly mounted on one side of the main controlling assembly, a sliding assembly slidably mounted on the guiding assembly, and a locking assembly mounted on the guiding assembly, wherein the locking assembly is the locking assembly according to claim 1.

* * * * *